(12) United States Patent
Chen et al.

(10) Patent No.: US 11,891,223 B2
(45) Date of Patent: Feb. 6, 2024

(54) DISPLAY PACKAGE CARTON AND SAFETY TENSIONING DEVICE SET FOR AUTOMOBILES THEREOF

(71) Applicant: Ningbo Xuli Metal Products Co., Ltd., Ningbo (CN)

(72) Inventors: Weiguo Chen, Ningbo (CN); Yanqiong Chen, Ningbo (CN); Wei Deng, Ningbo (CN); Peng Liu, Ningbo (CN)

(73) Assignee: Ningbo Xuli Metal Products Co., Ltd., Ningbo (CN)

( * ) Notice: Subject to any disclaimer, the term of this patent is extended or adjusted under 35 U.S.C. 154(b) by 97 days.

(21) Appl. No.: 17/812,000

(22) Filed: Jul. 12, 2022

(65) Prior Publication Data

US 2023/0339650 A1 Oct. 26, 2023

(30) Foreign Application Priority Data

Apr. 24, 2022 (CN) .......................... 202210435384.4

(51) Int. Cl.
| | |
|---|---|
| *B65D 5/52* | (2006.01) |
| *B65D 5/10* | (2006.01) |
| *B65D 5/42* | (2006.01) |
| *B60P 7/08* | (2006.01) |

(52) U.S. Cl.
CPC .............. *B65D 5/528* (2013.01); *B65D 5/10* (2013.01); *B65D 5/4208* (2013.01); *B60P 7/0823* (2013.01)

(58) Field of Classification Search
CPC ......... B65D 5/528; B65D 5/10; B65D 5/4208

USPC ................ 206/338, 745, 747, 750
See application file for complete search history.

(56) References Cited

U.S. PATENT DOCUMENTS

| | | | | |
|---|---|---|---|---|
| 3,724,650 | A * | 4/1973 | Forbes, Jr. ............. | B65D 5/528 |
| | | | | 229/120.32 |
| 10,633,140 | B1 * | 4/2020 | Vergara ................ | B65D 5/4266 |
| 2006/0231602 | A1 * | 10/2006 | Mu ........................ | B65D 5/302 |
| | | | | 229/125.015 |
| 2012/0187018 | A1 * | 7/2012 | Maglio .................. | B65D 85/34 |
| | | | | 206/524.4 |
| 2014/0318999 | A1 * | 10/2014 | Liang .................... | B65D 5/4208 |
| | | | | 206/349 |
| 2018/0168369 | A1 * | 6/2018 | Goldmeier ............. | A47B 57/58 |
| 2019/0039776 | A1 * | 2/2019 | Kioroglou ............ | B65D 5/4208 |

* cited by examiner

*Primary Examiner* — Jacob K Ackun
(74) *Attorney, Agent, or Firm* — Wang Law Firm, Inc.

(57) ABSTRACT

A display package carton and safety tensioning device set for automobiles thereof comprises a carton body (1) folded from a flat cardboard with a plurality of creases (100); the carton body (1) comprises a front display cardboard (101), a back cardboard (102), a left cardboard (103), a right cardboard (104), a top cardboard (105) and a closed bottom; the top cardboard (105) has a connecting portion folding downward at a rear edge of the top cardboard (105), the connecting portion is capable of being inserted into an inner side of the back cardboard (102); one of the left cardboard (103) and the right cardboard (104) is inserted into the back cardboard (102). The display package carton is more environment-friendly, the packaging efficiency is high. The tensioning devices can be taken out of the carton merely by opening the top cardboard or the side cardboard at will, both allowing easier operation.

10 Claims, 13 Drawing Sheets

DISPLAY PACKAGE CARTON AND SAFETY TENSIONING DEVICE SET FOR AUTOMOBILES THEREOF

TECHNICAL FIELD OF THE INVENTION

The present invention relates to the field of display package and storage, in particular to a display package carton and a safety tensioning device set for automobiles thereof.

BACKGROUND OF THE INVENTION

A safety tensioning device for automobiles generally consists of a main unit, a long strap, a short strap, a plurality of hooks, etc. The hooks are respectively connected to one end of the long and short straps and to corresponding securing points on cars or other means of transport. The short strap is fixedly connected to the main unit, while the long strap is a removable component connected to the main unit only when in use. There are also safety tensioning devices only consisting of a main unit, and a hook-free long strap with one end directly connected to the main unit.

The existing safety tensioning devices are mainly packaged in the following ways:

Convenience package: The straps are directly tied up. Although the package is simple, no trial operation is allowed and there is no space left for printing information such as operating instructions. Moreover, the tensioning device after use is randomly placed in the trunk or self-provided toolbox, which looks messy.

Package with plastic plates: A display stand is made of plastic plates, with the tensioning device tied thereto and a number of stickers with printed information stuck thereto. However, the plastic products are not environmentally friendly, and the manual effort is also required for stickers, resulting in high total cost and bad operations. What's more, the entire package is bulky and thus not easy for transportation or display in supermarket.

Package with cardboards: The tensioning devices are tied directly to the cardboards for display in a suspended state, but the manual effort is required to tie each tension device, so the package is bulky and troublesome to operate, and is not suitable for displaying the devices in standing state but only for packaging and displaying a small number of devices.

Package with an ordinary carton: The tensioning device is invisible directly or only visible partly, so the package does not allow actual operation.

To sum up, all the above packaging ways have obvious defects and thus need to be further improved.

SUMMARY OF THE INVENTION

It is a first object of the present invention to provide a display package carton which is high in packaging efficiency and formed without using glue or staples.

It is a second object of the present invention to provide a safety tensioning device set for automobiles, which is easy to display and access.

For achieving the first object, the display package carton comprises a carton body folded from a flat cardboard with a plurality of creases; wherein, the carton body comprises a front display cardboard, a back cardboard, a left cardboard, a right cardboard and a top cardboard which are folded along the plurality of creases, and the carton body has a closed bottom; the top cardboard is folded backward from an upper edge of the front display cardboard, the top cardboard has a connecting portion folding downward at a rear edge of the top cardboard, the connecting portion is capable of being inserted into an inner side of the back cardboard; one of the left cardboard and the right cardboard is inserted into the back cardboard; and the front display cardboard has a plurality of mounting holes for the items to be displayed.

Preferably, the connecting portion on the top cardboard is a first insertion strip; the back cardboard has a second insertion strip folding forward at a right or left edge of the back cardboard, the second insertion strip has a plurality of slots adjacent to the right or left edge of the back cardboard; and the left cardboard or the right cardboard has a plurality of inserting pieces extending from a rear edge of the left cardboard or the right cardboard, each inserting piece is folded and inserted into the corresponding slot. In this way, the top cardboard and the right or left cardboard of the package carton are closed and secured without loosening.

Preferably, there are two slots spaced up and down, and correspondingly, there are two inserting pieces spaced up and down.

In order to make the carton body more solid in structure, preferably, the left cardboard has a left upper folded piece at an upper edge of the left cardboard, the right cardboard has a right upper folded piece at an upper edge of the right cardboard; the left upper folded edge and the right upper folded edge located under the top cardboard after folded, and the top cardboard holds down the left upper folded edge and the right upper folded edge and is limited with the back cardboard after the connecting portion being inserted into the inner side of the back cardboard.

The bottom cardboard of the carton body may be of different structures closed in different ways. Preferably, the front display cardboard has a front lower folded piece at a lower edge of the front display cardboard, the back cardboard has a rear lower folded piece at a lower edge of the back cardboard; the left cardboard has a left lower folded piece at a lower edge of the left cardboard to the right, and the right cardboard has a right lower folded piece at a lower piece of the right cardboard; the front lower folded piece, the rear lower folded piece, the left lower folded piece and the right lower folded piece folded and interlocked together, forming the closed bottom of the carton body.

Preferably, the front lower folded piece holds down the left lower folded piece and the right lower folded piece, and the rear lower folded piece holds down the left lower folded piece and the right lower folded piece and is inserted into an inner side of the front lower folded piece.

In order to allow hanging display by the display package carton, preferably, the back cardboard has a protrude portion higher than the top cardboard extending from the top edge of the back cardboard, and a plurality of hanging holes are disposed on the protrude portion.

In order to enable the display package carton to display multiple sets of items to be displayed, there are multiple groups of mounting holes spaced left and right.

For achieving the second object, the safety tensioning device set for automobiles comprises a plurality of safety tensioning devices and a display package carton; wherein each safety tensioning device comprises a main unit and a strap disposed on the main unit; the mounting holes of the display package carton comprise a plurality of binding holes, through which the main unit and the strap are positioned with the front display cardboard of the display package carton.

Preferably, the binding holes comprises a plurality of first binding holes and a plurality of second binding holes spaced up and down, a plurality of threading holes are formed on the main unit, and the straps are rolled up, the main unit is secured to the front display cardboard by running a plurality of first ties through the threading holes and the first binding holes, and the rolled straps are secured to the front display cardboard by running a plurality of second ties through the second binding holes. Of course, the number of binding holes is not limited to two and may be adjusted accordingly for different products.

Preferably, the mounting holes further comprise a plurality of strap threading holes through which the strap disposed outside the display package carton is capable of moving onto a back side of the front display cardboard.

Preferably, there is one strap threading hole. Hook-free long straps may be tied outside the carton for display, and may also be put in the carton through the strap threading hole when the display is not required. For tensioning devices having long and short straps, the short strap can move onto the back side of the front display cardboard through the strap threading hole, while the long strap is rolled up and secured through the binding holes.

Preferably, there are two strap threading holes respectively disposed above and below the binding holes. In this way, for hook-free tension devices, the long strap can move in the carton through the lower strap threading hole and move out of the carton through the upper strap threading hole, is tied directly after being rolled up and folded, and is secured to the front display cardboard through the binding holes.

In order to determine the position for mounting the main unit, preferably, the mounting holes further comprise a first limited hole, the main unit has a second limited hole; the main unit is disposed in front of the front display cardboard, and a connector runs through the first limited hole, is inserted into the second limited hole and connected to main unit, so as to position the main unit on the front display cardboard.

In order to improve the tying strength and avoid the damage to the single plyboard of the carton, preferably, a reinforcing plate is disposed on the back side of the front display cardboard, the reinforcing plate has a plurality of connecting holes corresponding to the binding holes; and the main unit and the straps are connected to the reinforcing plate through the binding holes and the connecting holes.

Preferably, the reinforcing plate is further provided with a third limited hole aligned with the first limited hole and the second limited hole.

Preferably, the strap comprises a long strap and a short strap, where the long strap with a hook is rolled up and secured to the front display cardboard through the binding holes, and the hook is disposed on an outer side of the long strap. Of course, the hook may also be disposed on an inner side of the long strap.

Compared with the prior art, the present invention has following advantages. The top cardboard has a connecting portion folding downward at a rear edge of the top cardboard, the connecting portion is capable of being inserted into an inner side of the back cardboard, and one of the left cardboard and the right cardboard is inserted into the back cardboard, that is, the display package carton is designed into a double-cover structure in which both the top cardboard and the side cardboard can be opened, which can be formed without using glue or staples and thus is more environment-friendly. In addition, the display package carton does not need to be formed before packaging but formed gradually in the process of packaging products, so the packaging efficiency is high. When the display package carton is used for displaying safety tensioning devices, a few safety tensioning devices may be directly secured to the front display cardboard of the display carton for display, and more tensioning devices are placed without being tied in the package carton. The tensioning devices can be taken out of the carton merely by opening the top cardboard or the side cardboard at will, both allowing easier operation.

DETAILED DESCRIPTION OF THE INVENTION

The present invention will be further described in detail by embodiments with reference to the accompanying drawings.

Figure 1:
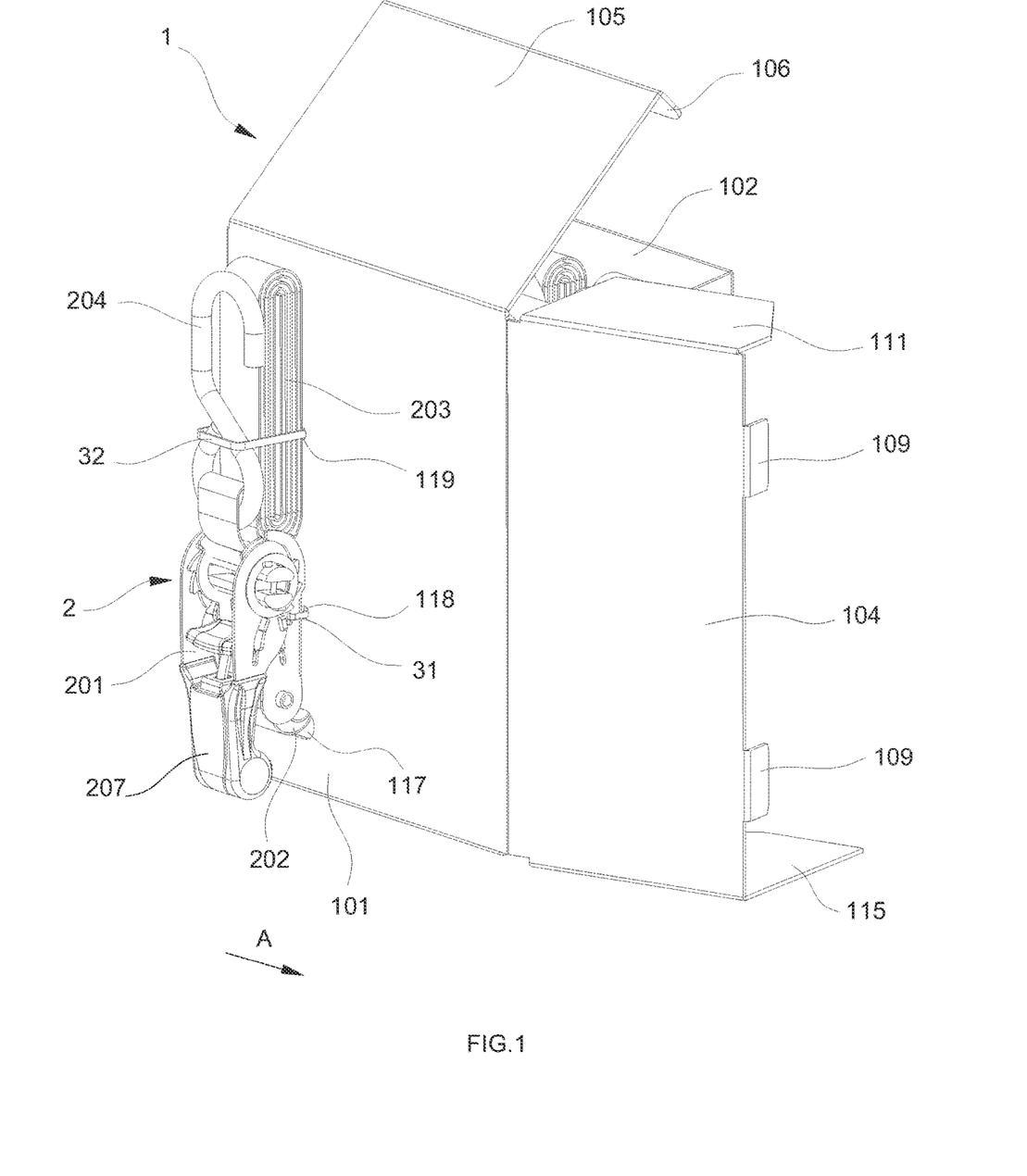
FIG. 1 is a front perspective view of a display package carton with a safety tensioning device set according to an embodiment of the present invention.

FIGS. 1-9 show a preferred embodiment of display package carton of the present invention. The display package carton in this embodiment is made of a flat cardboard that is cut to a proper size and pressed with a plurality of creases 100, and the flat cardboard is divided into several areas by the creases 100 and folded along the creases 100 into a one-piece carton body 1. The direction shown by arrow A in FIG. 1 is to the right, and the square carton body 1 comprises a front display cardboard 101, a back cardboard 102, a left cardboard 103, a right cardboard 104 and a top cardboard 105, and the carton body 1 has a closed bottom.

Figure 2:
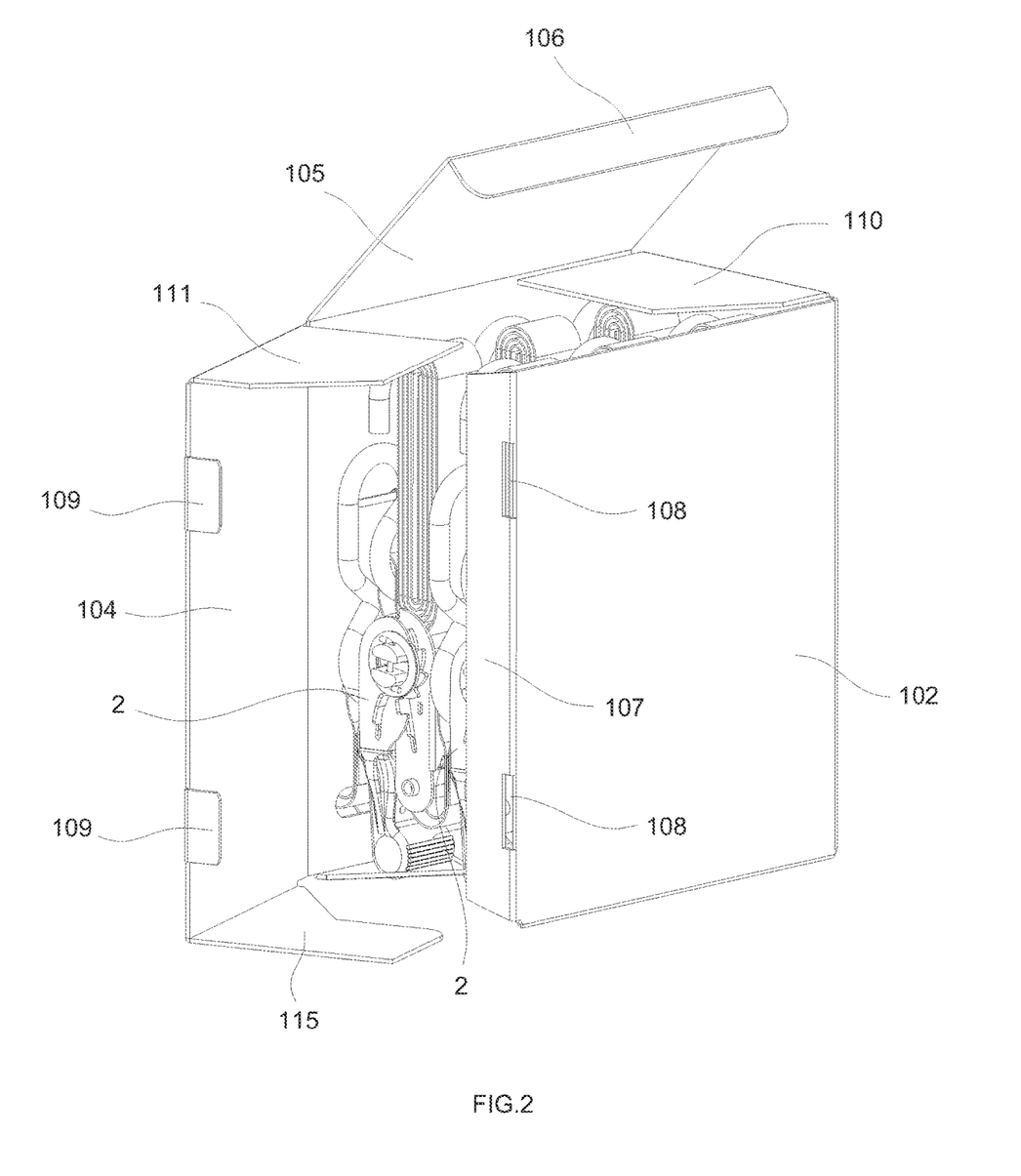
FIG. 2 is a back perspective view of the display package carton with a safety tensioning device set according to the embodiment of the present invention.
Figure 9:
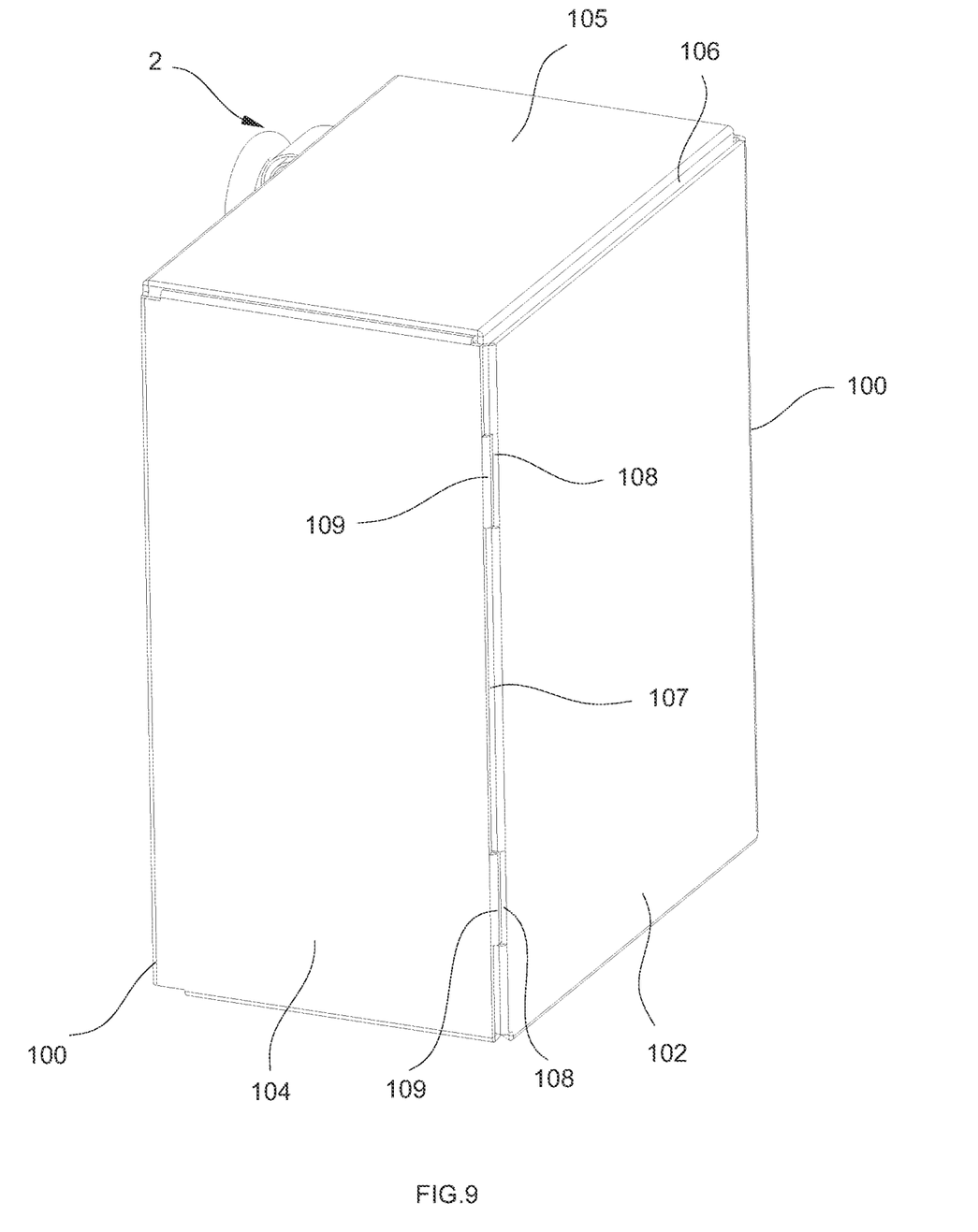
FIG. 9 is a perspective view of the package carton when a top cardboard is closed according to the embodiment of the present invention.

As shown in FIGS. 2 and 9, the top cardboard 105 is folded backward from an upper edge of the front display cardboard 101, and a first insertion strip 106 is formed by folding a rear edge of the top cardboard 105 down. The left cardboard 103 has a left upper folded piece 110 at an upper edge of the left cardboard 103, the right cardboard 104 has a right upper folded piece 111 at an upper edge of the right cardboard 104; the left upper folded edge 110 and the right upper folded edge 111 located under the top cardboard 105 after folded, and the top cardboard 105 holds down the left upper folded edge 110 and the right upper folded edge 111 and is limited with the back cardboard 102 after the first insertion strip 106 being inserted into the inner side of the back cardboard 102. In this way, the top cardboard 105 has a flip-up cover structure.

As shown in FIGS. 2 and 9, the back cardboard 102 has a second insertion strip 107 folding forward at a right edge of the back cardboard 102, the second insertion strip 107 has two slots 108 spaced up and down and adjacent to the right edge of the back cardboard 102, and the right cardboard 104 has two inserting pieces 109 extending from a rear edge of the right cardboard 104, each inserting piece 109 is folded and inserted into the corresponding slot 108 and secure the carton body 1. In this way, the right cardboard 104 and the back cardboard 102 are inserted into and fitted to each other, and the right cardboard 104 has a side-open cover structure.

In this way, the display package carton in this embodiment is of a double-cover structure in which both the top cardboard 105 and the right cardboard 104 (that is, a side cardboard) can be opened, and the carton body 1 is more environment-friendly because it can be formed without using glue or staples. In addition, the complete carton does not need to be formed before packaging but formed gradually during packaging products, so the packaging efficiency is high. After the carton is formed by folding, the top cardboard 105 and the right cardboard 104 of the carton body 1 are closed and secured without loosening.

The carton body 1 has a closed bottom designed as follows.

Figure 3:
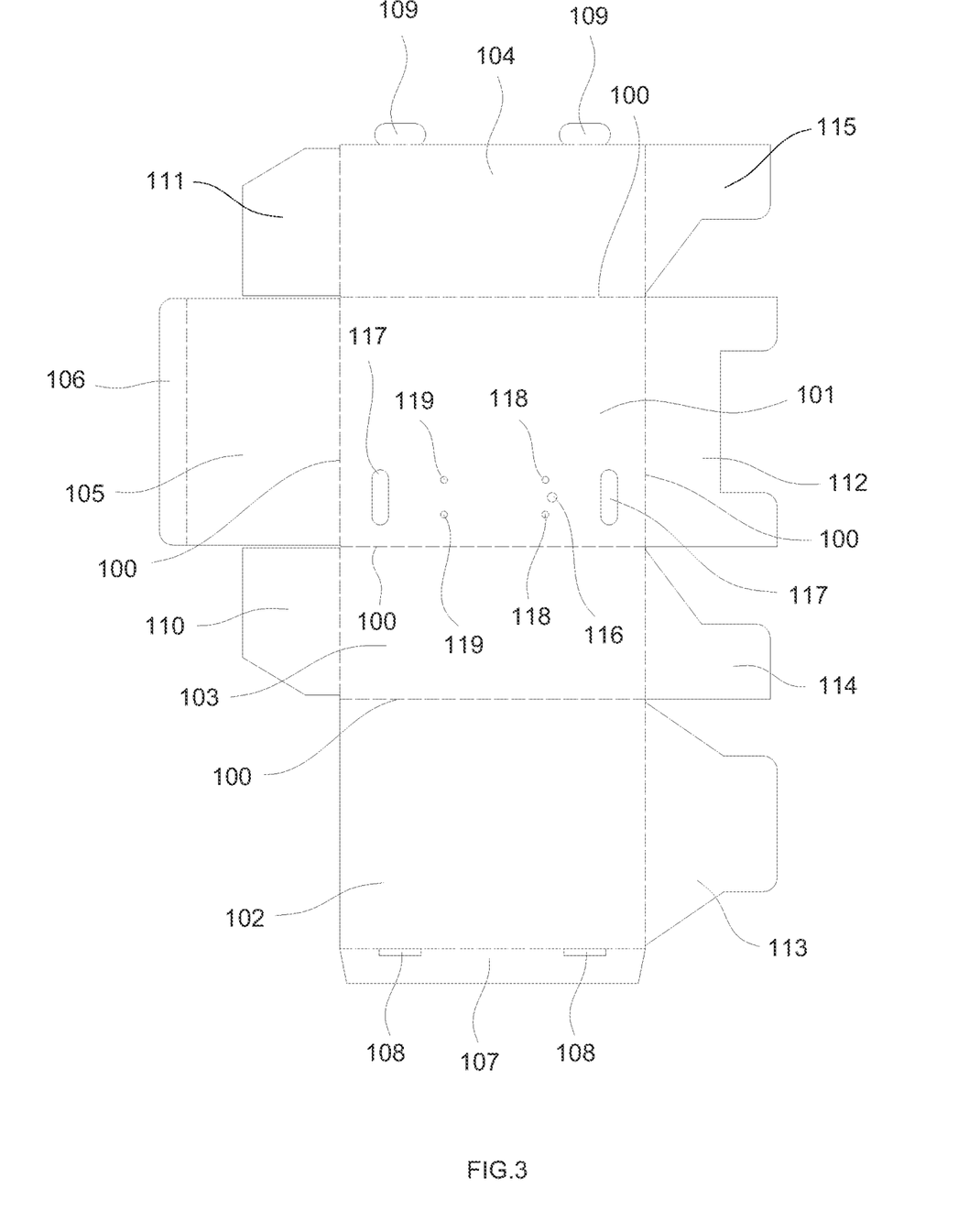
FIG. 3 is a plan view of the unfolded display package carton according to the embodiment of the present invention.

The front display cardboard 101 has a front lower folded piece 112 at a lower edge of the front display cardboard 101, the back cardboard 102 has a rear lower folded piece 113 at a lower edge of the back cardboard 102; the left cardboard 103 has a left lower folded piece 114 at a lower edge of the left cardboard 103 to the right, and the right cardboard 104 has a right lower folded piece 115 at a lower piece of the right cardboard 104. The front lower folded piece 112 holds down the left lower folded piece 114 and the right lower folded piece 115, and the rear lower folded piece 113 holds down the left lower folded piece 114 and the right lower folded piece 115 and is inserted into an inner side of the front lower folded piece 112. In this way, the front lower folded piece 112, the rear lower folded piece 113, the left lower folded piece 114 and the right lower folded piece 115 folded and interlocked together, forming the closed bottom of the carton body 1.

The display package carton can be used not only to display items, but also to store items. In order to position and secure the items to be displayed, a plurality of mounting holes are formed on the front display cardboard 101 of the display package carton, so that the items to be displayed are positioned and secured on the carton body 1 through the mounting holes.

In this embodiment, the item to be displayed is a safety tensioning device 2. The safety tensioning device 2 is the same as the existing device in term of structure, which comprises a main unit 201, a short strap 202, a long strap 203 and a plurality of hooks 204. The short strap 202 and the long strap 203 are mounted on the main unit 201, and the hook 204 is mounted on the short strap 202 and the long strap 203. A second limited hole 205 is formed on the bottom of the main unit 201, and a plurality of threading holes 206 are further formed on the main unit 201.

As shown in FIG. 3, the front display cardboard 101 in this embodiment has one group of mounting holes. In order to position and secure the safety tensioning device 2, each group of mounting holes consists of a first limited hole 116, two strap threading holes 117, two first binding holes 118 and two second binding holes 119. The two first binding holes 118 are located on left and right sides of the first limited hole 116, and the second binding holes 119 are located above the first binding hole 118, and one of the two strap threading holes 117 is located below the first binding holes 118 and the other one is located above the second binding holes 119. Of course, the number is not limited to one group, so there may be two or more groups of the mounting holes. The binding holes are not limited to the first binding holes 118 and the second binding holes 119, and the number of binding holes may vary with different products. Also, there may be only one strap threading hole 117, the same as that shown in FIG. 1.

Figure 4:
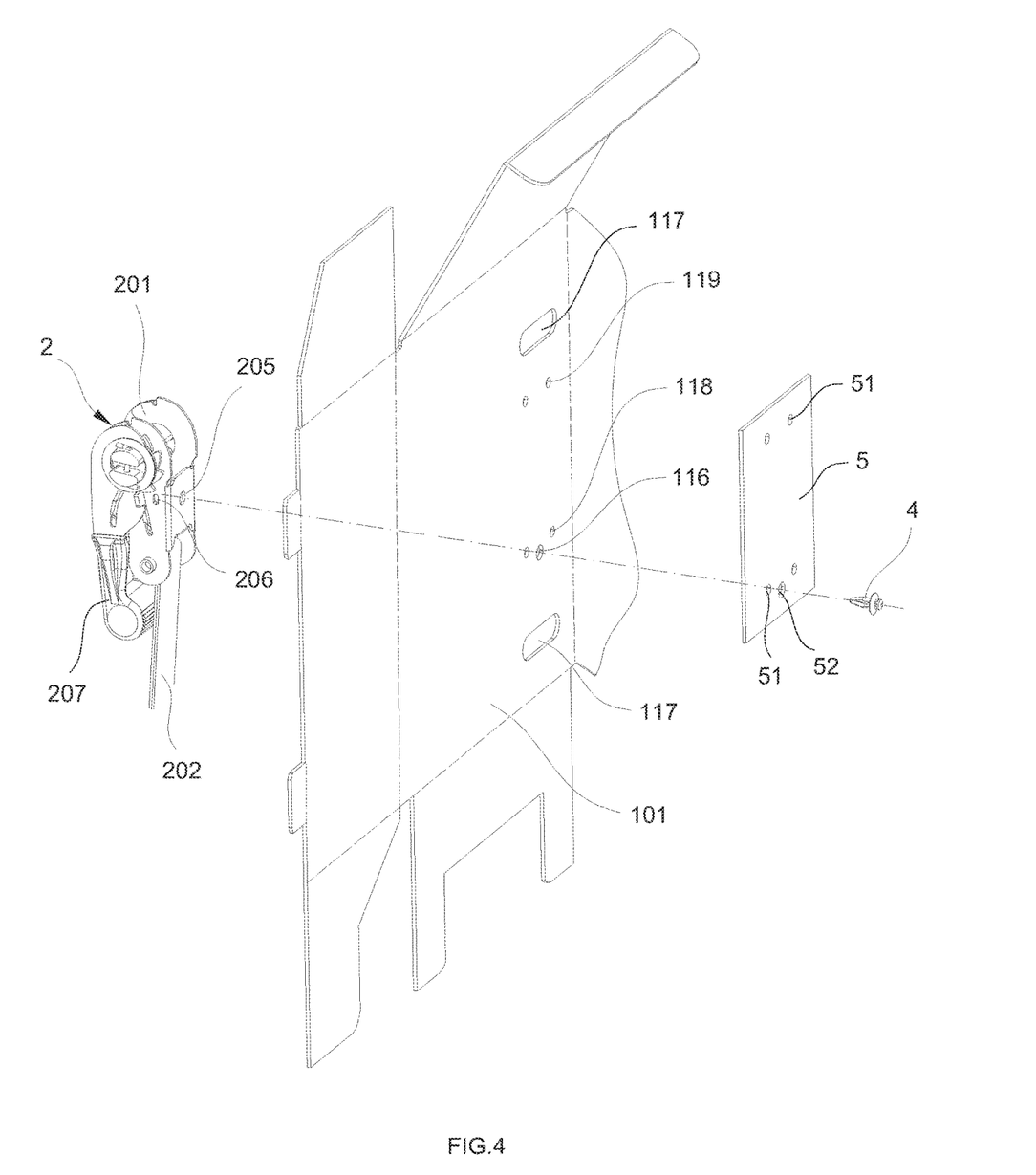
FIG. 4 is a diagrammatic view showing positioning a main unit of a safety tensioning device for external display on the display package carton according to the embodiment of the present invention.

As shown in FIG. 4, the main unit 201 of the safety tensioning device 2 is located on an outer side of the front display cardboard 101 of the carton body 1, the second limited hole 205 of the main unit 201 is aligned with the first limited hole 116 on the front display cardboard 101, and a reinforcing plate 5, having a third limited hole 52 aligned with the first limited hole 116, is formed on a back side of the front display cardboard 101, and a stop pin 4 runs through the third limited hole 52 and the first limited hole 116 in sequence from inside to outside, and is connected to and fixed in the second limited hole 205 for positioning the main unit 201. In addition to the stop pin 4, other connectors may also be used for fixed connection. Furthermore, a plurality of connecting holes 51 corresponding to the first binding holes 118 and the second binding holes 119 are further formed on the reinforcing plate 5. The main unit 201 and the straps can be fixedly connected to the reinforcing plate 5 through the first binding holes 118, the second binding holes 119 and the connecting holes 51. The reinforcing plate 5 is provided to enhance the strength of the cardboard for hanging items, so as to avoid the cardboard from being damaged by ties or by heavy products.

Figure 5:
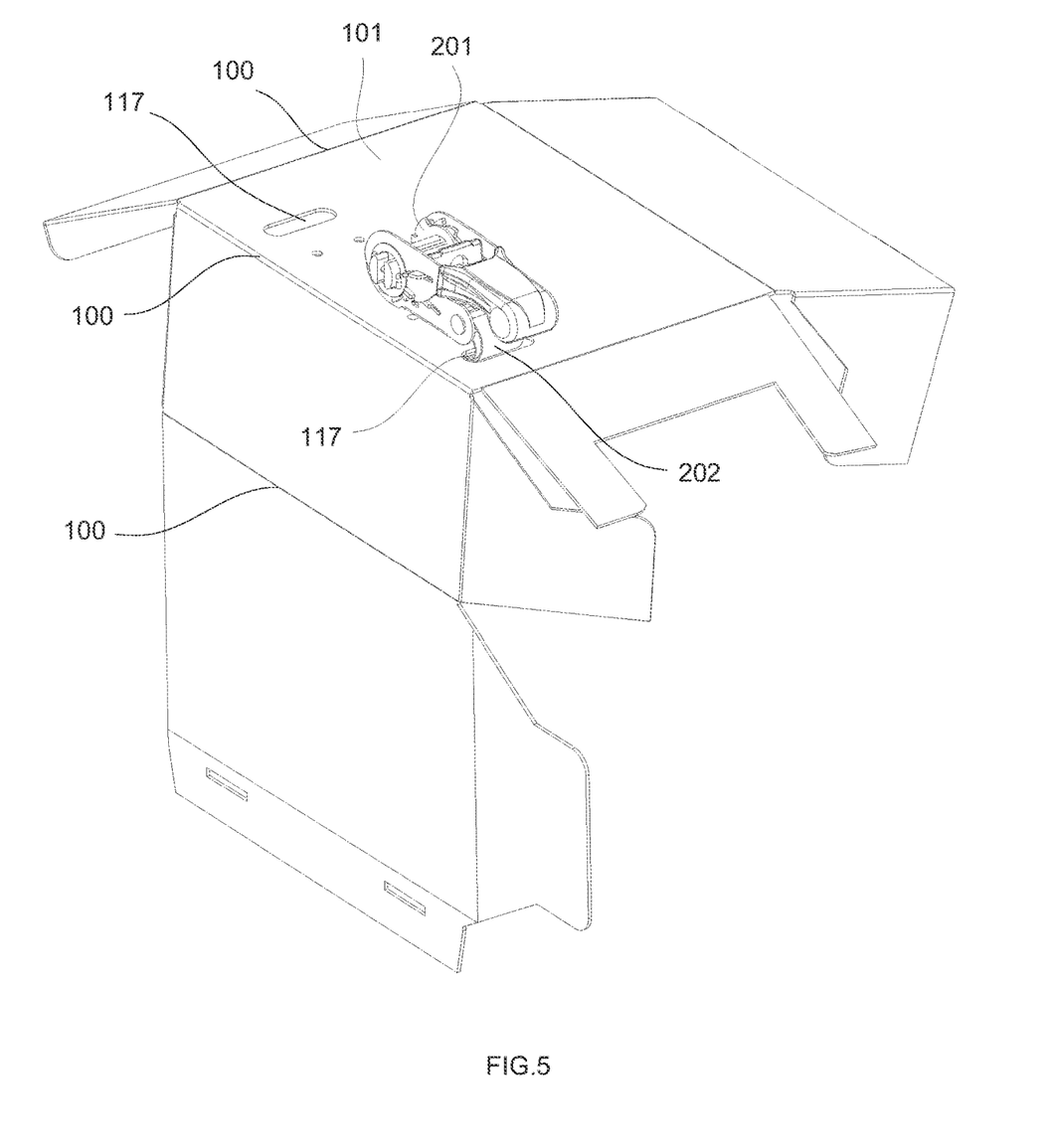
FIG. 5 is a front perspective view of a short strap of the safety tensioning device positioned on the display package carton according to the embodiment of the present invention.
Figure 6:
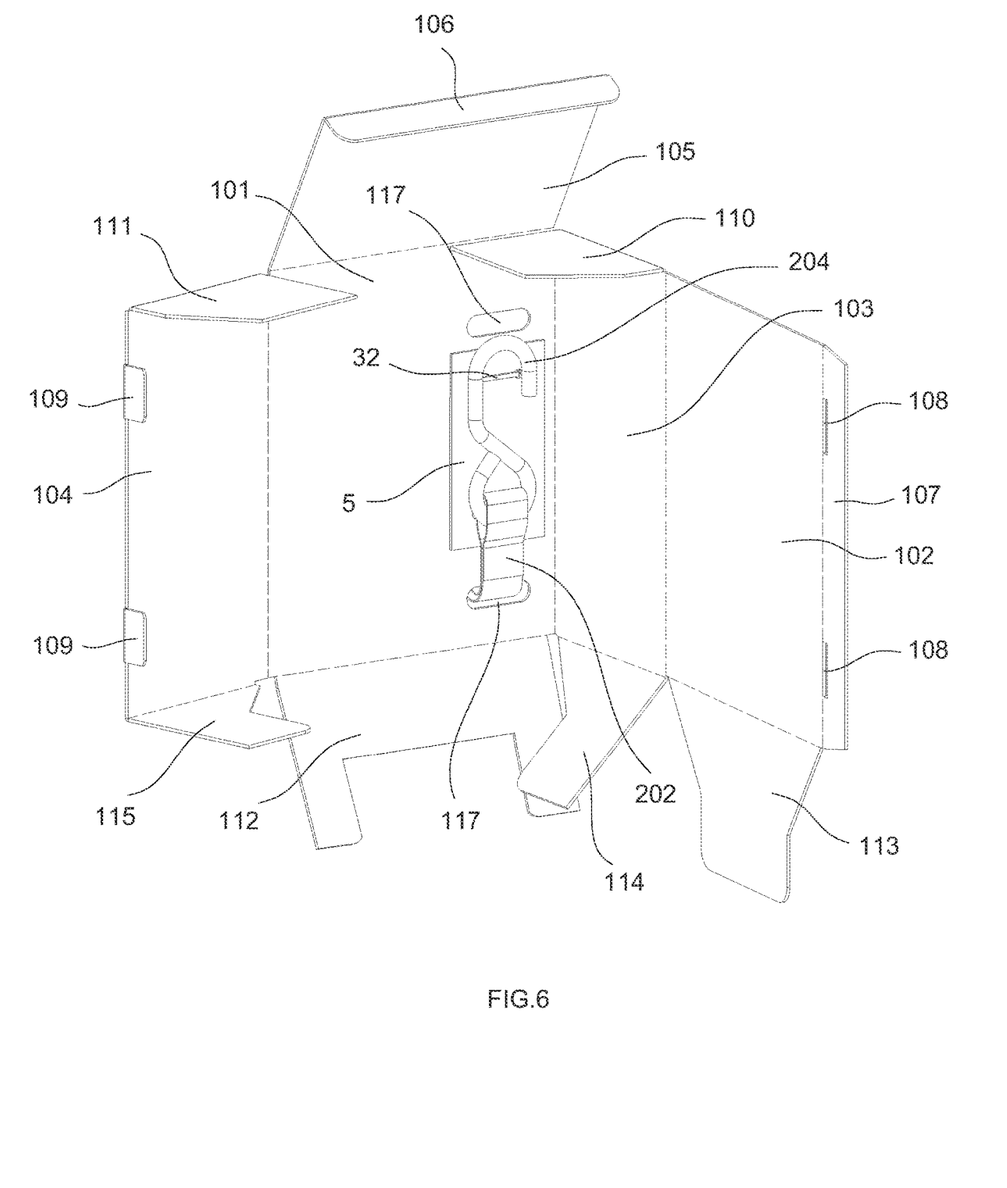
FIG. 6 is a back perspective view of the short strap of the safety tensioning device positioned on the display package carton according to the embodiment of the present invention.

As shown in FIGS. 5 and 6, the short strap 202 and the hook 204 connected to the short strap move onto the inner side of the front display cardboard 101 through a lower strap threading hole 117.

Figure 7:
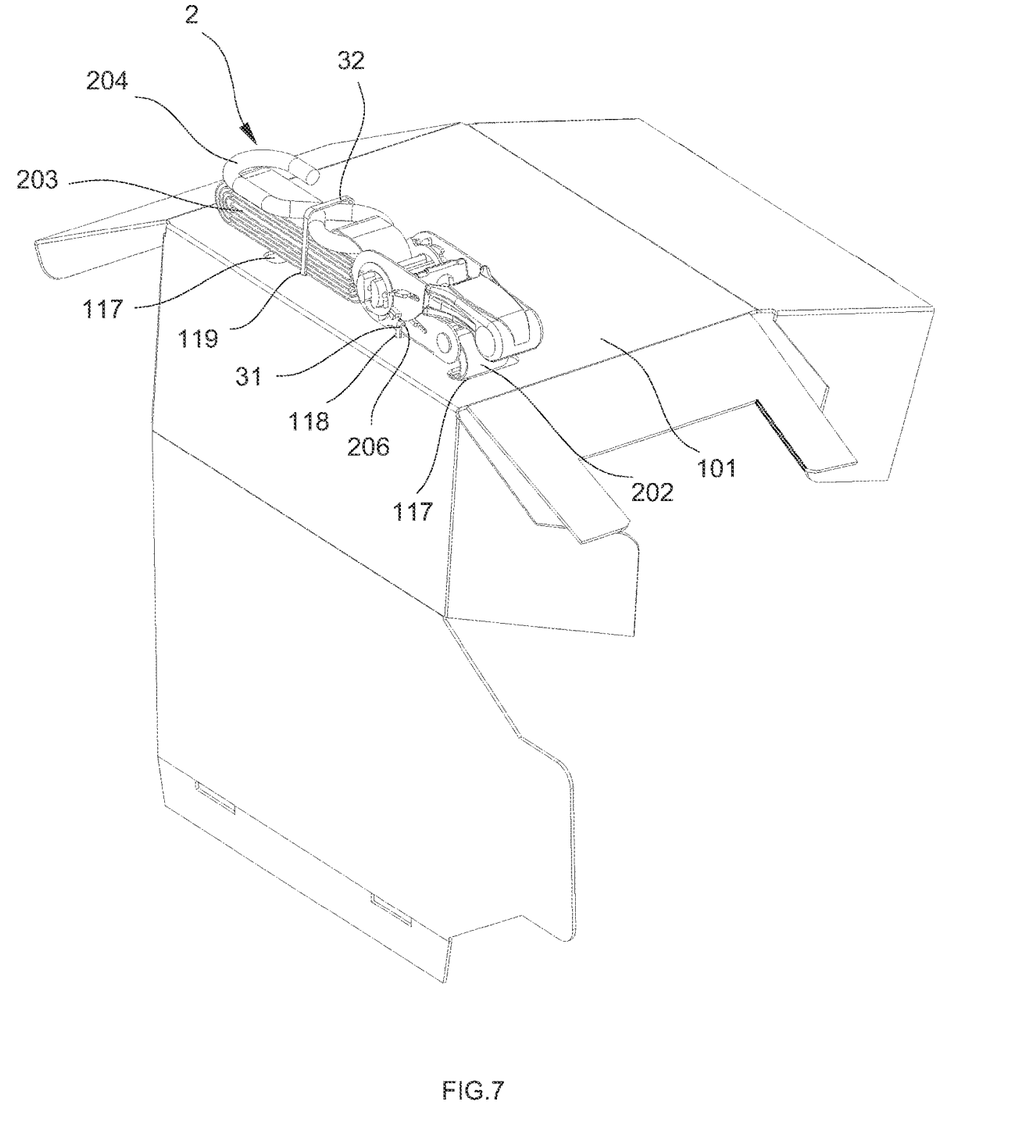
FIG. 7 is a perspective view showing the safety tensioning device for external display positioned on the display package carton according to the embodiment of the present invention.

As shown in FIG. 7, the long strap 203 with the hook 204 is rolled up in a proper size suitable for being placed on the outer side of the front display cardboard 101 of the carton body 1. The hook 204 connected to the long strap 203 is located on an outer side of the long strap 203, that is, the hook 204 faces outwards for easy display. The main unit 201 is further secured to the carton body 1 by running a plurality of first ties 31 through the first binding holes 118 and the threading holes 206 of the main unit 201. Also, the long strap 203 is secured to the carton body 1 by running an appropriate number of second ties 32 through the second binding holes 119, so that the safety tensioning device 2 to be displayed is completely secured. The first ties 31 and the second ties 32 may be ties such as Nylon ties or binding wires.

Figure 8:
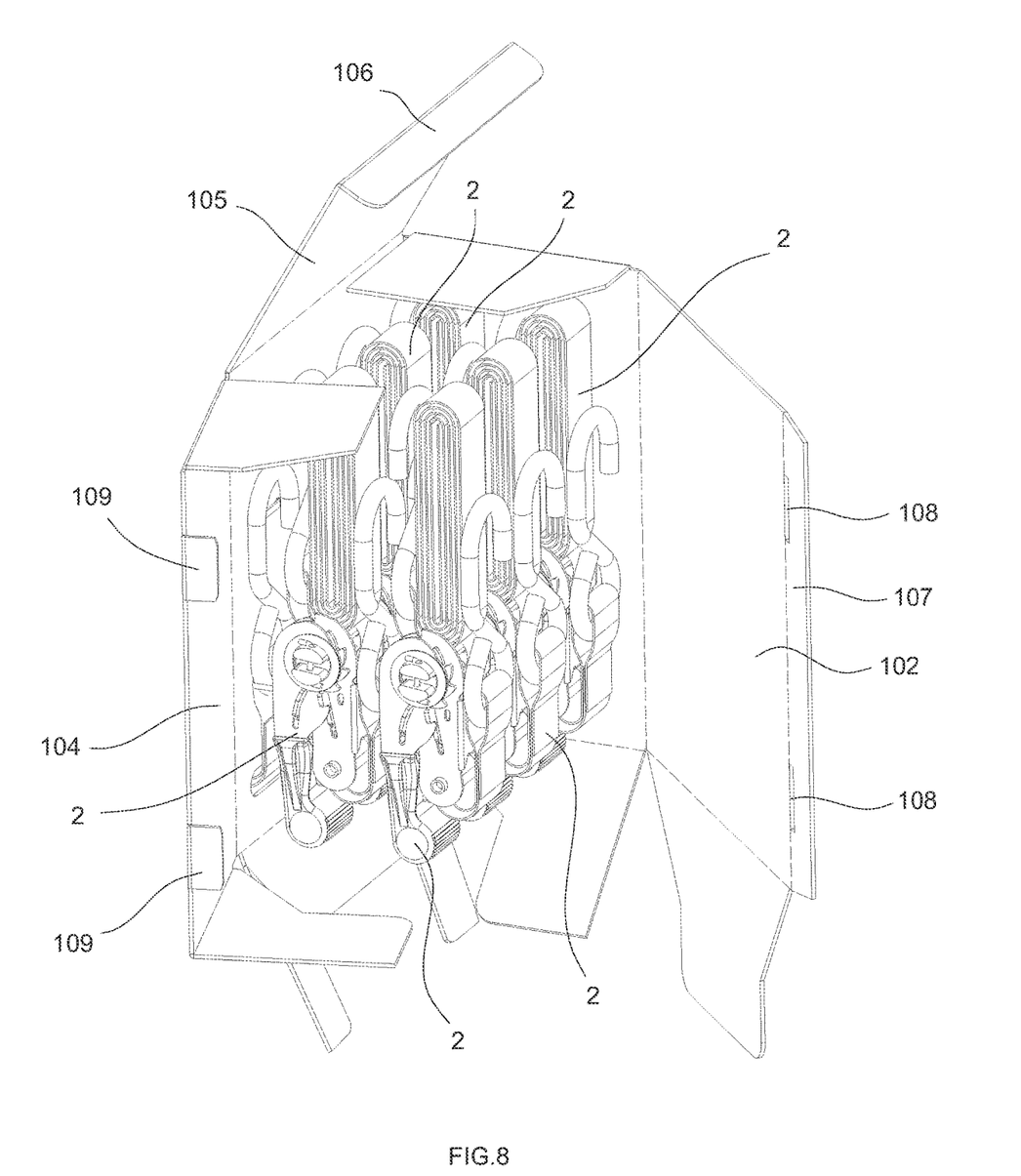
FIG. 8 is a perspective view showing multiple safety tensioning device sets locate inside the display package carton according to the embodiment of the present invention.

As shown in FIG. 8, the remaining safety tensioning devices 2 that do not need to be displayed may be placed in the package carton in sequence without being tied to the carton body 1, which makes the packaging easier.

As shown in FIG. 2, the safety tensioning device 2 can be taken out of the carton merely by opening the top cardboard 105 or the right cardboard 104 (that is, the side cardboard) at will, both allowing easier operation.

Figure 10:
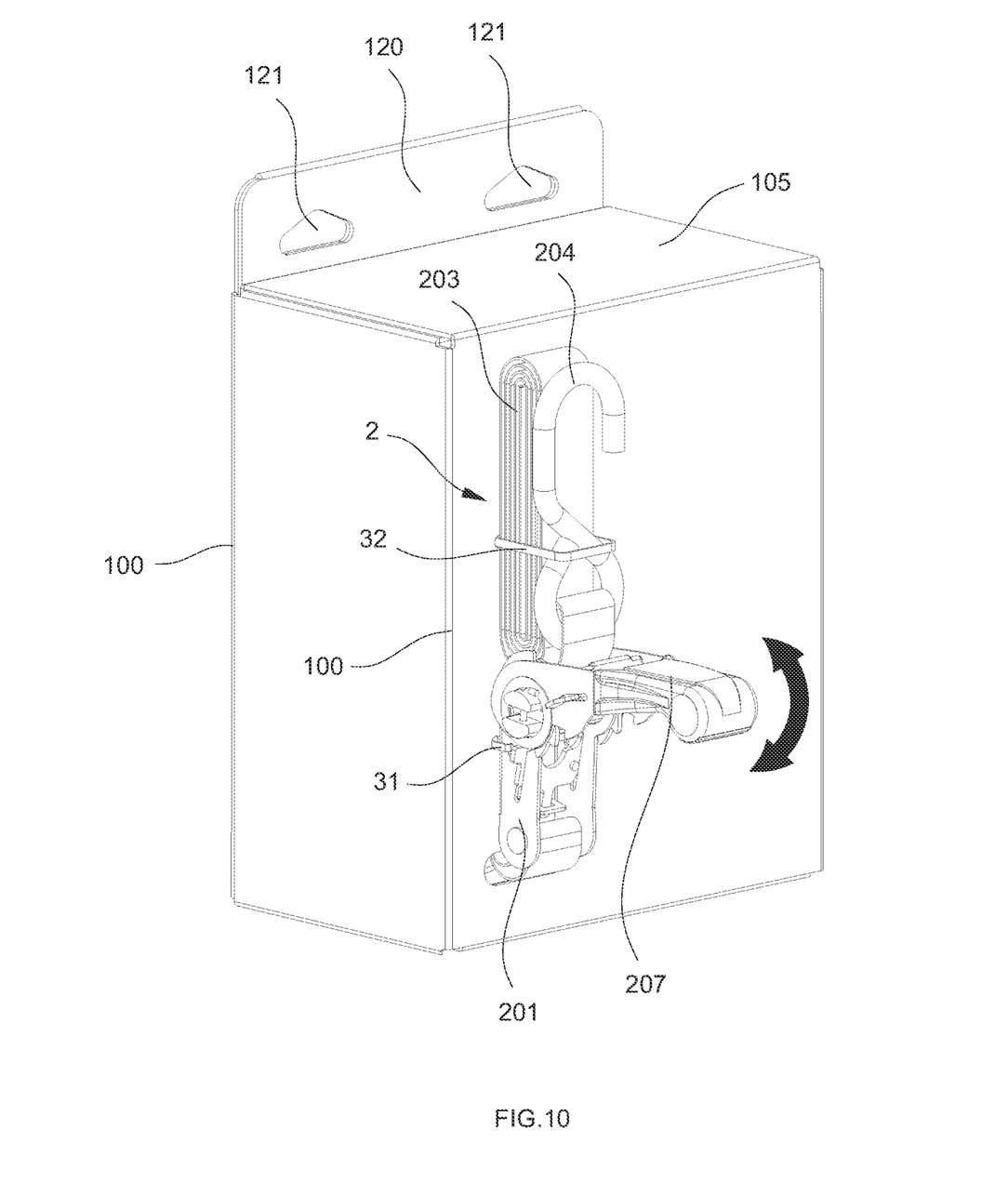
FIG. 10 is a perspective view of the package carton having a plurality of hanging holes and the operation of the main unit according to the embodiment of the present invention.

As shown in FIG. 10, the safety tensioning device 2 outside not only can be entirely displayed, but also allows trial operation. An operating handle 207 of the main unit 201 can be pulled open to test the functions related to the tensioning device.

This package is suitable for packaging multiple sets of products, where there may be one or more sets outside the carton body 1 for display and trial operation, as well as one or more sets invisible inside the carton. The external safety tensioning device 2 for display is secured to the front display cardboard 101 of the carton body 1.

As shown in FIG. 10, the back cardboard 102 has a protrude portion 120 higher than the top cardboard 105 extending from the top edge of the back cardboard 102, and a plurality of hanging holes 121 are disposed on the protrude portion 120. In this way, this package can not only be directly placed on a platform for display and sale, but also hung for display.

Figure 11:
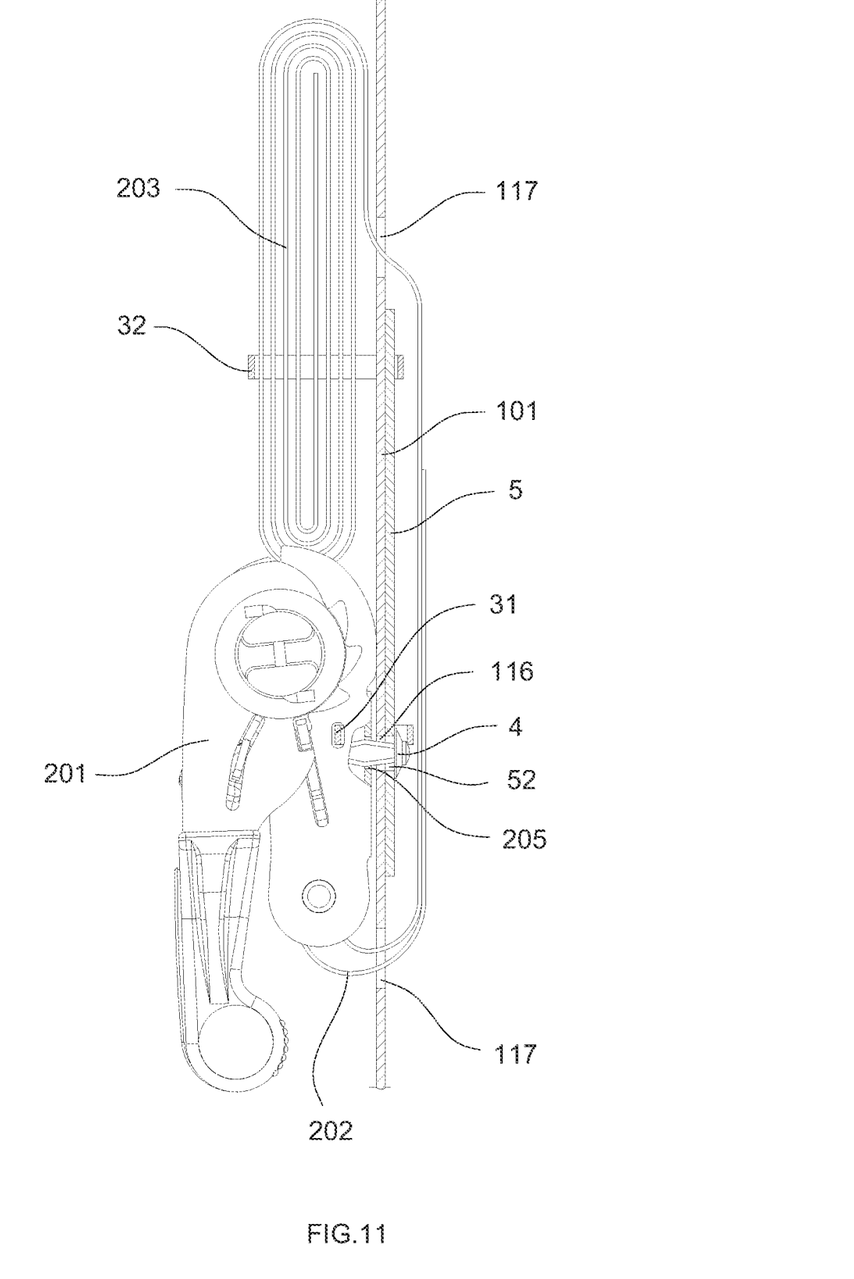
FIG. 11 is a sectional view showing a hook-free safety tensioning device positioned on a reinforcing plate of the display package carton according to the embodiment of the present invention.
Figure 12:
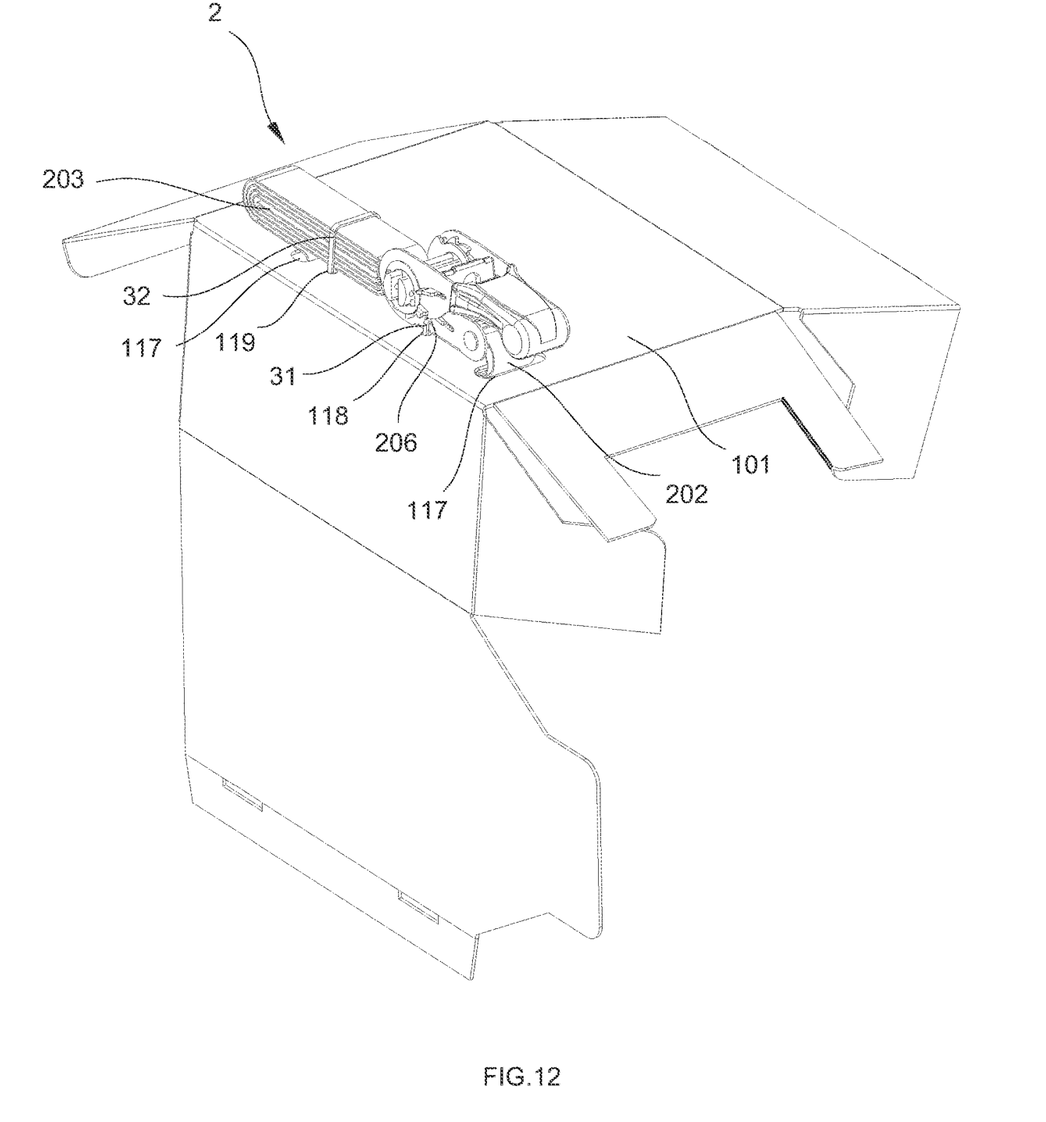
FIG. 12 is a perspective view showing the hook-free safety tensioning device positioned on the package carton according to the embodiment of the present invention.

As shown in FIGS. 11 and 12, the display package carton in this embodiment may also be used to display hook-free safety tensioning devices. The hook-free long strap 203 moves in the carton through the upper strap threading hole 117, and moves out of the carton through the lower strap threading hole 117. The hook-free long strap 203 can be tied to the outer side of the front display cardboard 101 for display.

In addition, the mounting holes on the front display cardboard 101 may only consist of binding holes, through which the safety tensioning device 2 is directly tied and fixed to the package carton. There is no need to provide limited holes or special threading holes on the main unit 201, or to provide limited holes or threading holes on the front display cardboard 101.

Figure 13:
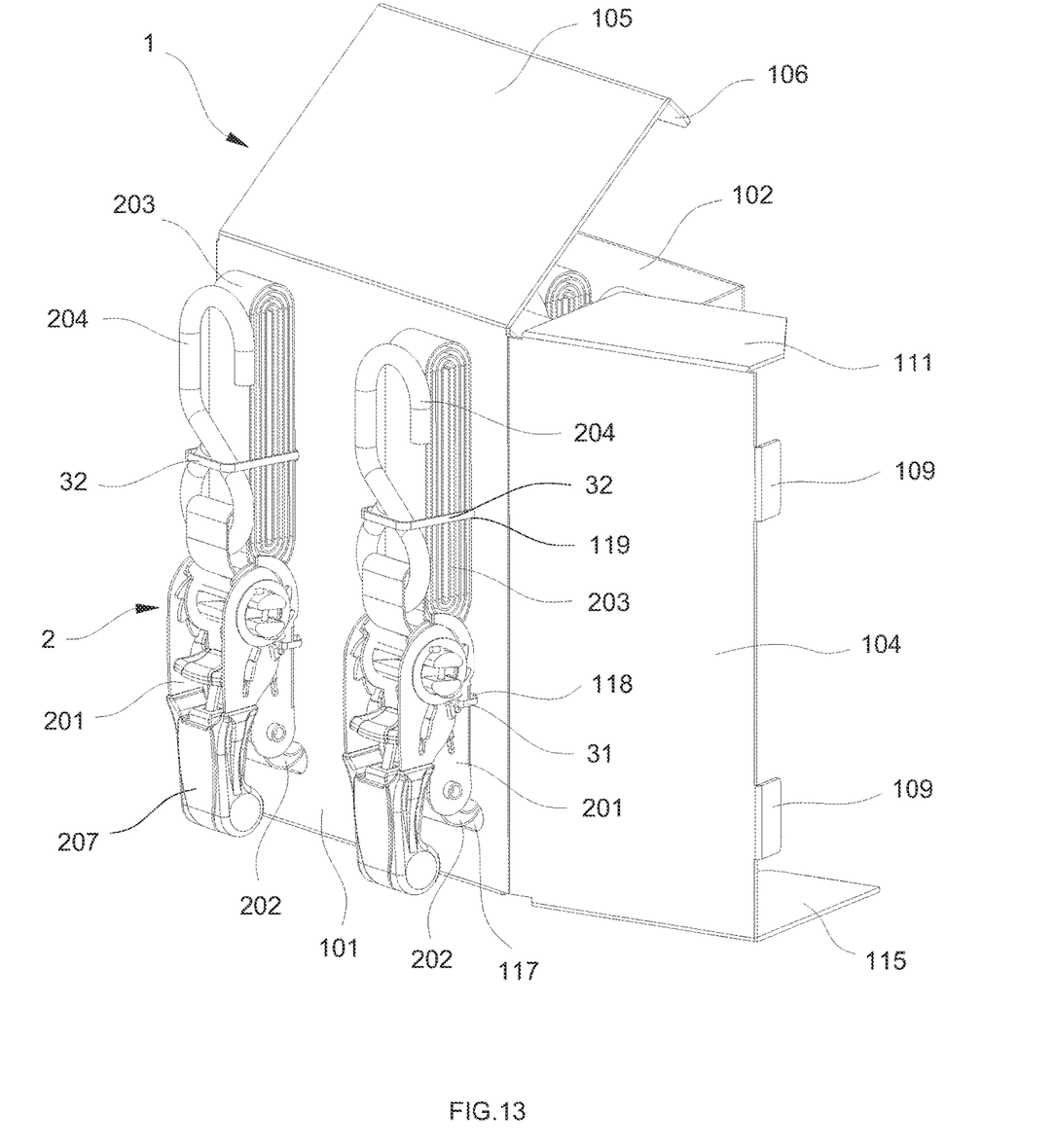
FIG. 13 is a front perspective view showing the package carton with two safety tensioning device sets positioned on according to the embodiment of the present invention.

As shown in FIG. 13, there are two groups of mounting holes spaced left and right on the front display cardboard 101 in this embodiment, that is, the package carton can display two safety tensioning devices 2. The specific structure for mounting the safety tensioning devices 2 to a car is the same as that in FIG. 1, which will not be repeated herein. Of course, more than two groups of mounting holes may also be provided to display multiple sets of tensioning devices.

Those described above are merely preferred embodiments of the present invention. It should be noted that a number of modifications or improvements may be made by those of ordinary skill in the art without departing from the principles of the present invention, and the package carton can not only be used for packaging ratchet tension devices as shown in the figures, but also for packaging other cargo control products, such as various over center buckles and cam buckles, all of which shall fall into the protection scope of the present invention.

The invention claimed is:

1. A display package carton, comprising a carton body folded from a flat cardboard with a plurality of creases; wherein,
   the carton body comprises a front display cardboard, a back cardboard, a left cardboard, a right cardboard and a top cardboard which are folded along the plurality of creases, and the carton body has a closed bottom;
   the top cardboard is folded backward from an upper edge of the front display cardboard, the top cardboard has a connecting portion folding downward at a rear edge of the top cardboard, the connecting portion is capable of being inserted into an inner side of the back cardboard;
   one of the left cardboard and the right cardboard is inserted into the back cardboard; and
   the front display cardboard has a plurality of mounting holes for the items to be displayed.

2. The display package carton of claim 1, wherein the connecting portion on the top cardboard is a first insertion strip;
   the back cardboard has a second insertion strip folding forward at a right or left edge of the back cardboard, the second insertion strip has a plurality of slots adjacent to the right or left edge of the back cardboard; and
   the left cardboard or the right cardboard has a plurality of inserting pieces extending from a rear edge of the left cardboard or the right cardboard, each inserting piece is folded and inserted into the corresponding slot.

3. The display package carton of claim 1, wherein the left cardboard has a left upper folded piece at an upper edge of the left cardboard, the right cardboard has a right upper folded piece at an upper edge of the right cardboard;
   the left upper folded edge and the right upper folded edge located under the top cardboard after folded, and the top cardboard holds down the left upper folded edge and the right upper folded edge and is limited with the back cardboard after the connecting portion being inserted into the inner side of the back cardboard.

4. The display package carton of claim 1, wherein the front display cardboard has a front lower folded piece at a lower edge of the front display cardboard, the back cardboard has a rear lower folded piece at a lower edge of the back cardboard;
   the left cardboard has a left lower folded piece at a lower edge of the left cardboard to the right, and the right cardboard has a right lower folded piece at a lower piece of the right cardboard;
   the front lower folded piece, the rear lower folded piece, the left lower folded piece and the right lower folded piece folded and interlocked together, forming the closed bottom of the carton body.

5. The display package carton of claim 4, wherein the front lower folded piece holds down the left lower folded piece and the right lower folded piece, and the rear lower folded piece holds down the left lower folded piece and the right lower folded piece and is inserted into an inner side of the front lower folded piece.

6. The display package carton of claim 1, wherein the back cardboard has a protrude portion higher than the top cardboard extending from the top edge of the back cardboard, and a plurality of hanging holes are disposed on the protrude portion.

7. A safety tensioning device set for automobiles, comprising a plurality of safety tensioning devices and a display package carton of claim 1;

wherein each safety tensioning device comprises a main unit and a strap disposed on the main unit;

the mounting holes of the display package carton comprise a plurality of binding holes, through which the main unit and the strap are positioned with the front display cardboard of the display package carton.

8. The safety tensioning device set of claim 7, wherein the mounting holes further comprise a plurality of strap threading holes through which the strap disposed outside the display package carton is capable of moving onto a back side of the front display cardboard.

9. The safety tensioning device set of claim 7, wherein the mounting holes further comprise a first limited hole, the main unit has a second limited hole;

the main unit is disposed in front of the front display cardboard, and a connector runs through the first limited hole, is inserted into the second limited hole and connected to main unit, so as to position the main unit on the front display cardboard.

10. The safety tensioning device set of claim 7, wherein a reinforcing plate is disposed on the back side of the front display cardboard, the reinforcing plate has a plurality of connecting holes corresponding to the binding holes; and the main unit and the straps are connected to the reinforcing plate through the binding holes and the connecting holes.

\* \* \* \* \*